Oct. 31, 1961 — J. R. ZEMAN — 3,006,100
FISH LURE TRIGGER MECHANISM
Filed June 3, 1960
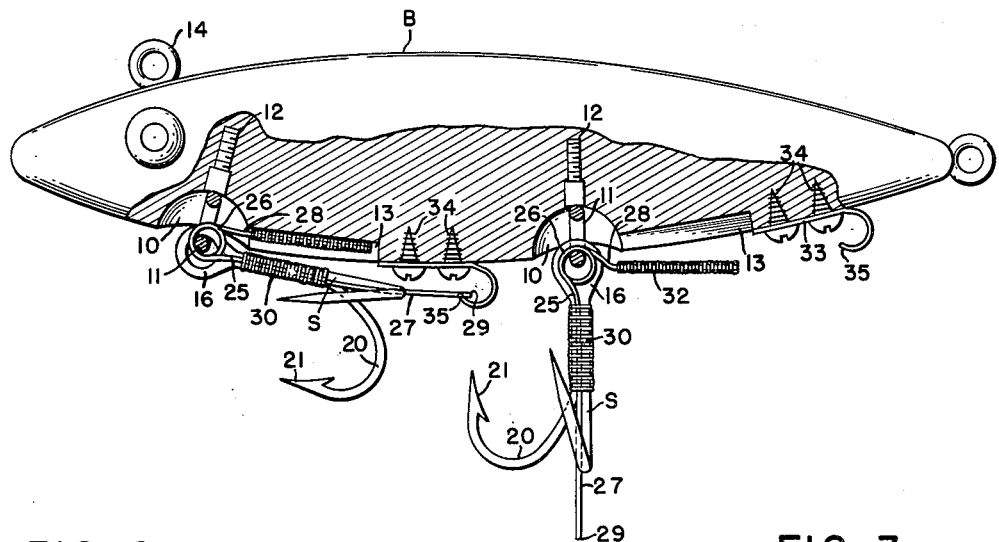
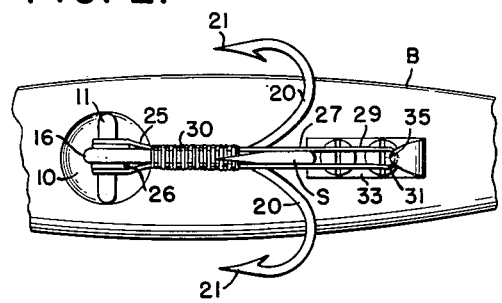
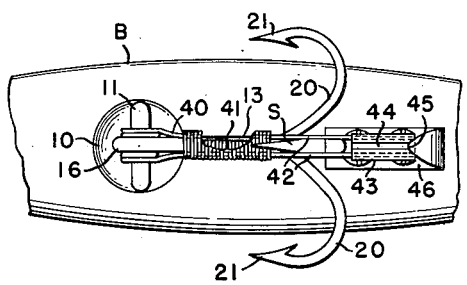
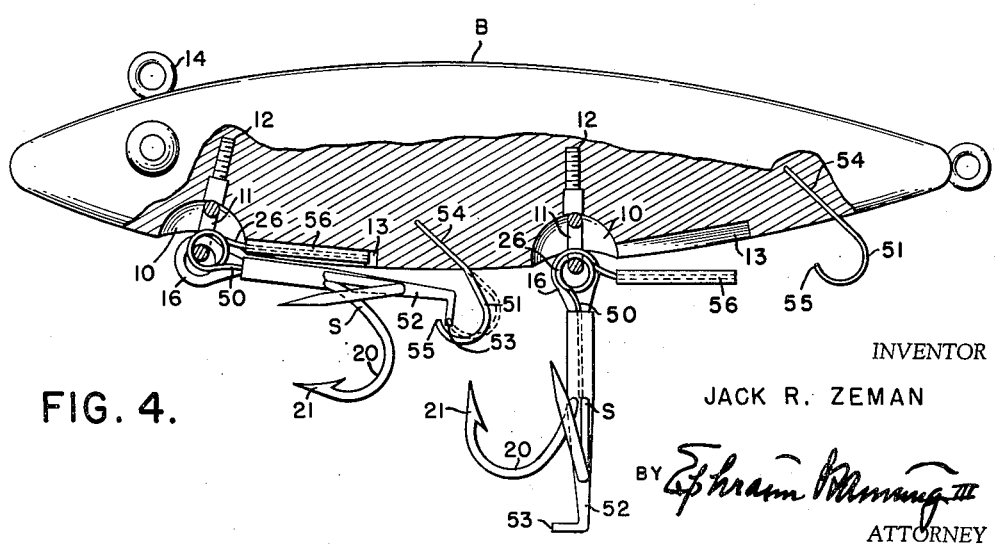
INVENTOR
JACK R. ZEMAN
BY *Ephraim ...*
ATTORNEY

United States Patent Office 3,006,100
Patented Oct. 31, 1961

3,006,100
FISH LURE TRIGGER MECHANISM
Jack R. Zeman, 2741 NE. 10th Ave.,
Fort Lauderdale, Fla.
Filed June 3, 1960, Ser. No. 33,804
10 Claims. (Cl. 43—35)

This invention relates to a trigger mechanism for fish lures whereby, upon engagement from a fish, a retracted hook will be released for swift advance to an open position wherein the hook will operate most effectively to catch the fish.

A primary purpose is to provide such a mechanism which will be inexpensive and completely reliable when put to use. Other objects are the provision of a spring so formed and connected to the hook as to assure instantaneous operation thereof when triggering takes place; a mechanism which is so mounted on an elongated base as to minimize drag when pulled through the water; means to normally prevent inadvertent triggering of the mechanism yet amply sensitive to be operated in response to a light nudge or bump from a fish; and a tandem mechanism for two or more such trigger operated hooks such that, immediately following advance of a rearward hook to an open impaling position, those hooks forwardly thereof will be sequentially activated for like operation.

These and other objects and advantages of my invention will be set forth hereinafter in the detailed description to follow in which reference will be made to the accompanying drawing which illustrates certain embodiments of the present triggering mechanism in a preferred form, in the manner following:

FIGURE 1 is a side elevation, partly in section, of a conventional fish lure equipped with a pair of like hooks, each having an associated trigger mechanism, the hooks being spaced apart tandem-wise and being pivotally supported from the lure bottom, the two hooks being in extreme opposite postions in that the forward one is retracted to lie close to the lure body ready for triggering whereas the after hook is in a freely suspended position, as when swung away from the lure body. FIG. 2 is a fragmentary bottom plan view of the lure showing a hook in retracted position close to the lure body, the same as the forward hook in FIG. 1. FIG. 3 is also a fragmentary bottom plan view of the lure showing in retracted position a hook with which is associated a trigger mechanism slightly different from that illustrated in FIGS. 1 and 2. And FIG. 4 which is a view similar to FIG. 1, shows a further modified construction of trigger mechanism associated with two tandem-arranged hooks.

The present fish lure comprises an elongated base B whereon is mounted a rigid hook having associated therewith the trigger mechanism of this invention. The base, as shown, may be in the form of a conventional plug, commonly referred to as an artificial minnow. At one or more selected points along the sides or bottom, the base is socketed at 10 to accommodate an eye 11 having an associated shank 12 which is threaded for secure anchorage to the base. The eye 11 is so positioned rotatively that its axis is disposed transversely of the base B. Communicating with each socket is a seat in the form of an open slot 13 extending longitudinally of the base for a limited distance. An eye 14 near its forward end provides a ready means by which to attach a leader or line to the base whereby to draw it through the water.

The hook here shown comprises a rigid shank S enlarged at one end to provide an eye 16. This eye traverses the anchored eye 11, being thereby connected to the base for a universal pivotal movement relative thereto. The shank eye 16 is accommodated in part within the base socket 10 whereby to permit the shank to swing to a position parallel with and closely adjacent the proximate face of the base B. The shank S at its free end is formed with a return bend 20 having at its extremity a reversely-facing barbed hook 21. The number of such hooks carried by the shank at its free end is optional— 1, 2, 3 or 4 being suggested. A shank so formed is conventional and common at the present time. Since the lure, and hook (or hooks) carried thereby is identical in all figures of the drawing, the description up to this point applies to all of them so that the same reference characters designate corresponding parts thereof.

Referring first to FIGS. 1 and 2, I utilize a resilient wire, such as piano wire or the like, which is formed into a spring 25 providing a desired source of power. The cross section of the wire may be round, flat, square, or otherwise. Intermediately of its ends the spring 25 is provided with one or more coils 26, the remaining straight portions of the spring—an arm 27 and a foot 28—extending away therefrom in wide-angled relation when the coil is expanded to a state of relaxation. To operatively fit a spring of this description to the shank S, the coil is disposed adjacent its eye 16, the foot 28 is rested within the seat formed by the base slot 13, and the arm 27 is extended alongside the shank to terminate therebeyond in a free end portion 29. The arm is fixedly anchored to the shank at 30, as by soldering, wire-wrapping, or otherwise. From a tensioned position closely adjacent the base and parallel therewith, the spring arm 27 operates on the shank S to swing it through considerably more than 90° toward the forward end of the base. In the initial stage of this movement the foot 28 of the spring 25 exerts a thrust force against the base B, but in a later stage, when the spring coil 26 has reached a state of relaxation, the foot is free to swing out and away from its seat 13. These two positions of the spring foot 28 are clearly shown in connection with the two hooks illustrated in FIG. 1.

In the form presented in FIGS. 1 and 2, the wire forming the spring 25 is bent upon itself at a point midway of its length to provide a loop 31 at its free end 29, the arm, coil and foot then becoming duplex in character. In such a spring, the companion arms 27 are disposed alongside opposite faces of the shank S, the companion coils 26 lie adjacent opposite faces of its eye 16, and the two companion feet 28 extend alongside each other in which position they may be fixedly united at 32, as by soldering, wire-binding, or otherwise. A spring so formed and joined to the shank S maintains a balanced relationship therewith whereby to exert equalized resilient thrust forces thereupon during the biasing stage of its movement. This is particularly true if the spring coils 26 lying upon opposite sides of the shank eye 16 be inserted through the anchored eye 11 (see FIG. 1) which provides a pivotal mounting therefor.

The remaining fitting comprised in my improved trigger mechanism is a hook 33 forming a catch at one end of a bar which may be affixed to the base, as by a pair of screws 34, at a point just beyond the closed end of the seat 13 and in alignment therewith. The catch hook 33 faces toward the spring 25 when the shank S is swung to a cocked position adjacent the base B. The acting end 35 of the hook is preferably tapered and so disposed as to establish a point engagement, i.e., one of the very restricted area, with the spring end portion 29 (and to be centered within the loop thereof, in the case of a duplex spring), when the shank is fully retracted to cocked position (as in the forward hook in FIG. 1 and the single hook shown in FIG. 2). The catch may optionally be formed of spring metal so as to permit retraction of its acting end 35 when the shank S is to be secured in cocked position. The shank may also be manipulated into cocked position by an appropriate lateral movement without requiring any deflection on the part of the catch hook acting end 35. The duplex form of spring 25, whereby a seat in the form of a loop is provided at its free end 29, is particularly advantageous where the catch hook 33 makes a point engagement therewith, since means is thereby provided to center one with respect to the other. This tends, in consequence, to restrain release of the triggered shank in response to only a light lateral force.

Referring now to FIG. 3, the general form of the spring 40 may be the same as already described in connection with FIGS. 1 and 2. As shown, the spring in one end portion is provided with feet 41 and at its other end portion with two arms 42 which are fixedly enclosed within a flattened sleeve 43 formed of a metal strip whose opposite edges remain slightly apart to define a seat in the form of an open seam 44. This seat, when disposed oppositely of the base B when the shank is in cocked position, will then be entered by the acting end 45 of a catch 46 which may be the same as already described in connection with FIGS. 1 and 2. In such a construction, any accidental lateral displacement of one from the other cannot readily occur. This is a feature of advantage, particularly when the lure, with its shank in cocked position, is placed away in a tackle box or elsewhere for storage along with other lures having unrestrained hooks. By the means described, I minimize entanglement of the lures, one with another, when so stowed.

In FIG. 4 I have shown a lure and tandem hooks identical with those already described in connection with FIGS. 1 and 2. The wire spring 50 comprised in the trigger mechanism as well as the catch 51 are, however, modified in certain minor respects. The free end portions of the spring arms are enclosed within a fixedly-applied flat sleeve 52 whose free end portion is laterally bent at 53 to provide a lip. The catch 51 may be suitably secured to the body of the lure, as by anchorage of its shank 54 therein. This shank may be in the form of a spring ribbon having its exposed acting end 55 bent to provide a hook facing toward the sleeve 52 which encloses the spring arms. Such a hook which is resilient may be forcibly advanced so that its acting end will engage the lip 53 when the hook shank S is swung upwardly close to the body of the lure into retracted position, as per the forward hook in FIG. 4. The spring 50 is provided with a foot 56 adapted to engage the base B when rested in its slot 13, thereby biasing the shank S to disengage itself from the catch hook 55. Such a disengagement will take place immediately in response to any fish-applied shock or impact sufficient for this purpose. A trigger mechanism comprising such a resilient spring catch may be relied upon to safely maintain the associated hook in retracted position except when it encounters a sudden force of sufficient magnitude, and for this reason it has special utility when stowed away with a number of other lures in a tackle box or elsewhere, and entanglement of one with another is to be avoided.

A fish lure may be equipped with one or more trigger mechanisms as herein described. If arranged tandemwise, as shown in FIGS. 1 and 4, there is a special advantage in so spacing them that the rearward shank S (or the hooks thereon) will, when released to swing through its full movement, engage the forward shank (or the hooks thereon) to produce a triggering thereof. Accordingly, if a fish should strike the lure in its rearward area, the proximate shank will be triggered to swing forwardly into a position of maximum effectiveness and, in so doing, will produce a similar operation of the forward trigger mechanism. Such a sequential chain operation is made possible by aligning the two shanks S with both associated catches whereby the normal movement path of the rearward shank and its hooks is in intersecting relation with the forward shank and its hooks.

It is to be noted that each shank S is mounted to swing universally so that it may move away from the base B through an arc that is either coplanar with the axis of the eye shank 12 or laterally, i.e., obliquely relative thereto. Also provision is made for partially recessing the trigger mechanism—the shank eye 16, the foot 28 of the spring, and its coil 26—whereby to attain a substantial degree of streamlining and minimization of drag. Within the seat 13 the spring foot remains confined against movement while the shank S is being manipulated to cocked position. When so seated, lateral swinging movement of the spring arm is opposed whereby to prevent release of the hook from its retracted position. When the hook is once released, in response to triggering, the spring foot is free to leave its seat so that further movement of the shank S may proceed in any direction with full freedom so to do. The spring power available in a duplex spring of the kind herein described may be amplified, as desired, through the formation therein of multiple coils 26, thereby assuring a split-second instantaneous response whenever the shank S is triggered. The mechanism is also sufficiently sensitive to be triggered for operation in response to a fish striking, slashing, bumping, nudging or grasping the lure. With the shank in the normal cocked position, the overall size of the lure is reduced substantially, whereby to facilitate its entry into the open mouth of a fish; and once in its mouth, when the presence of the hook can first be detected, the shank will have been triggered for instantaneous movement to its released position, so that it is then too late for the fish to disgorge the lure. The hooks—there will usually be two or more on each shank—snap immediately to their open positions in response to the power released by the spring which is unaffected by any forward movement of the lure when trolled or retrieved. A fish so caught will be unable to shake, or rid itself of, the lure due to the secure engagement of its hooks with the mouth or body of the fish. Also there is the point of merit that but small expense is involved in production of the trigger mechanism, it being confined mainly to the spring and catch and their assembly with the shank S and base B in each instance.

I claim:

1. In a fish lure having an elongated base with line-attaching means near its forward end, a shank having one end in pivotal connection with the base and formed at its opposite end with a hook having a reversely facing point, and trigger mechanism for the shank comprising a wire spring having an arm fixedly connected to the shank, extended alongside thereof from points beyond its opposite ends and formed with a medial coil proximate to the pivoted end of the shank, the spring portion beyond the coil and shank forming a foot disposed in wide-angular relation to the latter when in a freely relaxed state of expansion but adapted to engage resiliently with the base when the shank is swung toward the foot to reduce the angle therebetween, and a spring-engaging catch anchored to the base within the movement path of the spring arm, the latter, when engaged by the catch, being held relatively close to the base in retracted position whereby to sustain the shank also in close relation thereto with the coil of the spring contracted to a state of maximum tension, the spring arm, when disengaged from the catch, acting to free the spring coil for expansion whereby to swing the shank to a relaxed wide-angle position relative to the spring foot and base engaged thereby.

2. A fish lure trigger mechanism according to claim 1 wherein the wire spring is bent upon itself at a medial point to provide a loop forming a seat at the furthest point beyond the hook end of the shank and elsewhere being duplex with parallel arms fixedly connected to the shank, the catch being substantially aligned with the duplex arms with its acting end formed to occupy the seat at the looped end of the spring when engaged therewith.

3. A fish lure trigger mechanism according to claim 1 wherein the coil of the spring wire is disposed adjacent the pivoted end of the shank and in pivotal connection with the base.

4. A fish lure trigger mechanism according to claim 1 wherein the base is provided with a seat into and out of which the spring foot may freely move to be confined thereby against lateral movement when rested therein.

5. A fish lure trigger mechanism according to claim 1 wherein the catch is resilient to swing toward and from the spring arm for releasable engagement therewith.

6. A fish lure trigger mechanism according to claim 1 wherein the spring arm terminates in a lip and the catch is resilient to swing toward and from the spring arm for releasable engagement with the lip thereof.

7. In a fish lure having an elongated base with line-attaching means near its forward end, a shank having one end in pivotal connection with the base and formed at its opposite end with a hook having a reversely-facing point, and trigger mechanism for the shank comprising a wire spring bent upon itself at a medial point to form a loop from which a pair of substantially parallel arms is extended to lie alongside the shank in fixed connection therewith and therebeyond to provide a free end portion, the loop being positioned at a point outwardly of and beyond the hook end of the shank, there being a pair of substantially parallel coils formed in the two arms disposed oppositely of the shank adjacent the point of its pivotal connection with the base, the wire portions beyond the coils, remote from the looped end of the spring, forming a foot disposed in wide-angular relation to the arms when the coils are in a freely relaxed state of expansion but adapted to engage resiliently with the base when the shank is swung toward the foot to reduce the angle therebetween, a sleeve enclosing the free end portion of the arms and fixedly secured thereto, and a spring-engaging catch anchored to the base within the movement path of the sleeved arms for releasable engagement therewith to maintain the shank in retracted position adjacent the base.

8. A fish lure trigger mechanism according to claim 7 wherein the sleeve is flattened and provided with a seat, and the catch is in the form of a hook tapering toward a point adapted to occupy the sleeve seat when the shank is retained thereby in retracted position.

9. A fish lure trigger mechanism according to claim 7 wherein the sleeve beyond the free end portion of the arms is provided with a lip and the catch is resiliently movable toward and from the sleeve for releasable engagement with its lip.

10. In a fish lure having an elongated base with line-attaching means near its forward end, a pair of shanks each having one end in pivotal connection with the base and each formed at its opposite end with a hook having a reversely-facing point, a pair of catches, one for each shank, each of said catches adapted to releasably hold its associated shank in a retracted position close to the base, and spring means in connection with each shank and biasing the same to swing it forwardly and away from the base, the pivotal connections for the two shanks and the catches all being aligned and the normal movement path of the rearward shank being located in intersecting relation to the forward shank when in retracted position whereby, upon release of its catch, the rearward shank will be spring-biased to swing forwardly to strike the forward shank to trigger the same for release from its catch.

References Cited in the file of this patent
UNITED STATES PATENTS
1,268,097    Crandall _____ June 4, 1918
FOREIGN PATENTS
108,463    Sweden _____ Sept. 14, 1943
225,042    Germany _____ Aug. 17, 1910